Dec. 30, 1969  B. B. HERRINGTON ET AL  3,486,481
APPARATUS FOR SUPPORTING AUXILIARY PANELS
WHILE PAINTING AUTOMOBILE BODIES
Filed March 18, 1966  3 Sheets-Sheet 1

INVENTOR.
Bernard B Herrington
James M. Stout
BY

ATTORNEY

Dec. 30, 1969 B. B. HERRINGTON ET AL 3,486,481
APPARATUS FOR SUPPORTING AUXILIARY PANELS
WHILE PAINTING AUTOMOBILE BODIES
Filed March 18, 1966 3 Sheets-Sheet 2

INVENTOR.
Bernard B. Herrington
James M. Stout
BY
ATTORNEY.

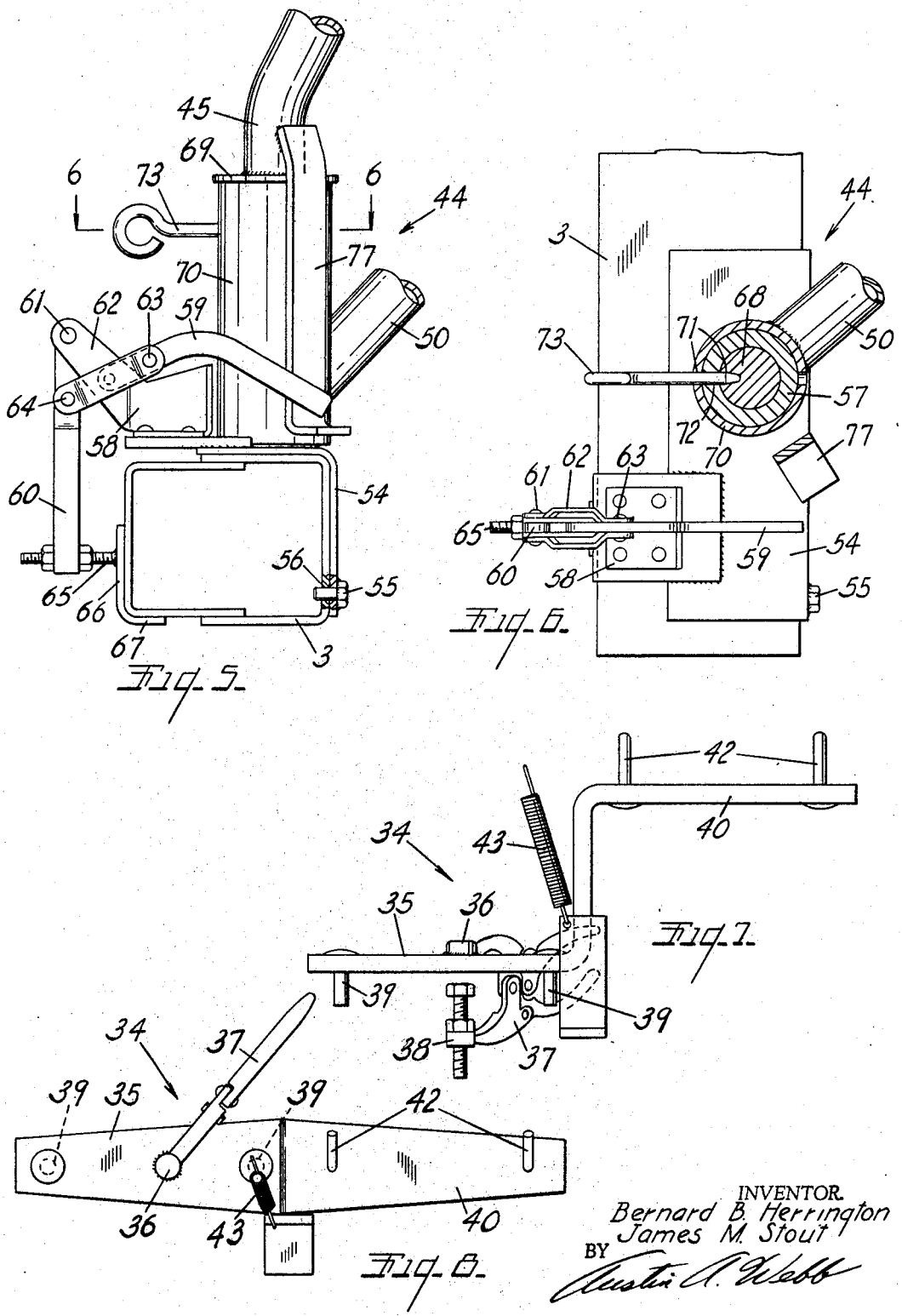

United States Patent Office 3,486,481
Patented Dec. 30, 1969

3,486,481
APPARATUS FOR SUPPORTING AUXILIARY PANELS WHILE PAINTING AUTOMOBILE BODIES
Bernard B. Herrington, Rte. 1, Shelbyville, Mich. 49344, and James M. Stout, 4262 W. D Ave., Kalamazoo, Mich. 49001
Filed Mar. 18, 1966, Ser. No. 535,558
Int. Cl. B05c 11/124
U.S. Cl. 118—503        6 Claims

ABSTRACT OF THE DISCLOSURE

Mounting fixtures having temporary supported engagement with permanent parts of an automobile body and frame are provided with releasable clamping connections that coact with parts of the body or frame which are later permanently connected to auxiliary fender and hood panels of the body. The fixtures in turn have supporting parts arranged to temporarily support the auxiliary panels. The fixtures engage the panels through holes which are later used to receive fasteners for permanently connecting the panels to the body. The hood supporting fixture is connectable to a swingable part of the regular hood hinge.

Outline of the invention

The regular fastener receiving holes which are used for final production connection between the body proper and the auxiliary hood and fender panels of an automobile are used to temporarily connect fixtures to the body and swingably support the auxiliary panels adjacent their final assembled position. The body panels can then be advanced concurrently through a painting and drying process to paint all of the parts at the same time.

Other objects and advantages of the invention will be apparent from consideration of the following description and claims. The drawings of which there are three sheets illustrate the steps of the painting method of the invention and highly practical forms of the temporary supporting fixtures for the auxiliary panels of the body.

FIGURE 1 is a fragmentary side elevational view partially broken away of an automobile body with auxiliary or detachable panels therefor temporarily supported thereon for painting according to the method of the invention by means of supporting fixtures of the invention.

FIGURE 2 is a fragmentary vertical cross sectional view taken along the plane of the line 2—2 in FIGURE 1 and conventionally illustrating part of the painting process of the invention.

FIGURE 3 is a fragmentary enlarged side elevational view of one of the rear fender supporting fixtures shown in FIGURE 1.

FIGURE 5 is a fragmentary enlarged front elevational view of the temporary fixture for supporting the front fenders and front wheel house panels of the automobile on the frame of the body as shown in FIGURE 1.

FIGURE 6 is a fragmentary horizontal cross sectional view taken along the plane of the line 6—6 in FIGURE 5.

FIGURE 7 is an enlarged side elevational view of the temporary supporting fixture for connecting the hood panel of the automobile body to the body proper during the painting process of the invention.

FIGURE 8 is a top plane view of the hood supporting fixture shown in FIGURE 7.

Figure 4:
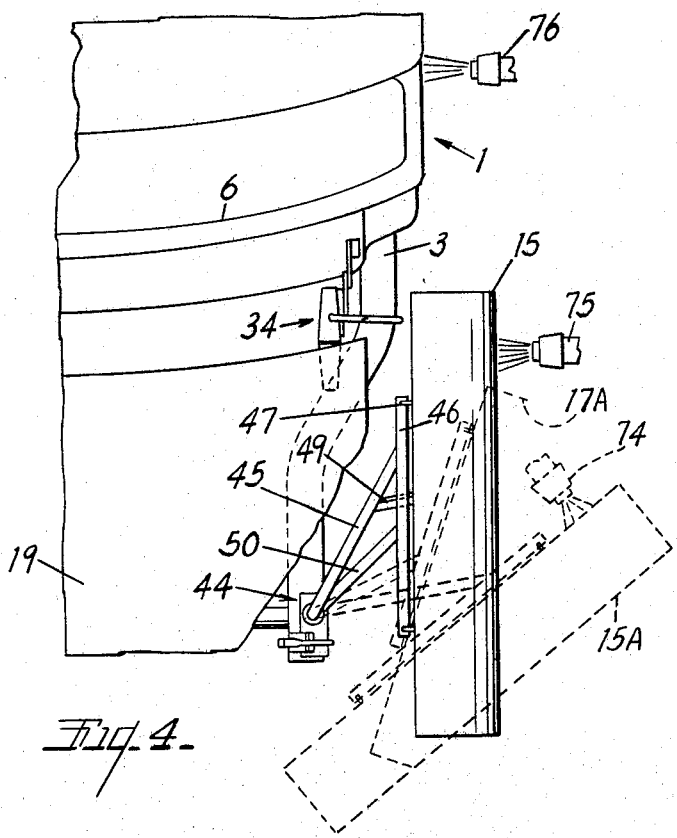
FIGURE 4 is a fragmentary top plane view of the front end of the body shown in FIGURE 1 with parts broken away and showing temporary supports for movably connecting detachable parts of the body to the body proper for painting according to the process of the invention.

FIGURE 1 illustrates more or less conventionally an automobile body 1 which is built up upon or connected to a frame 2 having forwardly projecting portions 3 which support the engine and other parts not illustrated and to which the front wheels 4 are connected in various manners. No attempt has been made to illustrate specific details of the body, frame and wheel mounting as these differ from model to model and form no part of the present invention. Generally the body includes the usual doors 5, windshield opening or frame 6 with a forwardly projecting fire wall 7 which separates the interior of the body from the engine and engine compartment. At the rear of the body there is provided an inner panel 8 which separates the trunk and rear of the passenger compartment from the rear wheel conventionally shown at 9. At the rear the body proper is provided with a series of holes 10 for receiving fasteners by means of which the rear fender 11 is removably connected to the body over the rear wheels. The fender 11 has an inwardly turned flange 12 along its top and ends through which the fasteners are engaged so as to be concealed from the outside of the vehicle.

At the forward end of the body adjacent to the front door post 13 the side of the fire wall 7 is provided with similar holes 14 for receiving fastenings for securing the rear edge of the front fender 15 to the body. Further forwardly and sometimes offset transversely inwardly of the fire wall is a second series of holes 16 arranged to receive bolts or other fasteners for fastening the rear edge of an inner wheel house panel 17 to the front of the body. When assembled the inner wheel house panel and outer fender panel 15 are further connected together for mutual support but no attempt has been made to illustrate the details of this connection as it is common and may be varied considerably while utilizing the concept of the invention.

The front of the fire wall portion 7 supports a hinge assembly generally indicated at 18 for swingably supporting the hood 19 of the automobile at the front of the body and between the front fenders 15 and wheel house panels 17. The hinge assembly 18 includes an upper hood supporting member or bar 20 which is ultimately connected to suitable reinforcing and permanent connecting portions of the hood, not illustrated. At this stage in the manufacture of the automobile the body is commonly supported on a suitable carriage 21 or other part of a mechanical conveyor to be advanced through various working stages by a conveyor chain 22.

The structure of the invention for temporarily supporting the rear fenders 11 on the body is shown most clearly in FIGURES 2 and 3. As illustrated a pair of hooks 23 are provided with upper arms 24 that project through the openings or holes 10 in the inner rear panel 8 and have upright cross pins 25 at their inner ends which prevent the hooks from pulling out of the holes after being inserted and rotated to the positions illustrated. Secured to the underside of the arm 24 is an angle clip 26 having an arcuate lower flange 27 which bears against a vertical section 28 of the rear body panel and holds the hook in generally outwardly projecting position, as shown in full lines, while permitting upward tilting of the hook to the dotted position shown at 23A in FIGURE 3. The downwardly turned arm 29 on the outer end of the hook has a reversely bent lower hook end 30 which loosely engages and supports the inturned flange 12 of the rear fender so that the fender can be lifted upwardly for spray painting its rear or underside as conventionally illustrated by the spray nozzle 31. The outer surface of the fender can be painted by the same nozzle and from the same source of paint as indicated at 32. It is also convenient and practical to paint the outer side of the inner wheel house 8 by directing the same spray nozzle thereagainst as indicated at 33 when the rear fender is raised for painting the underside of the fender. All parts of the rear fender, rear wheel house and the rear of the body can thus be painted at the same time and from the same source to assure a standard and common shade of color for all the painted parts.

The hood 19, as previously mentioned, is designed and provided with fastening means for ultimate attachment to the top connecting element 20 of the hinge assembly 18 so that the hood will swing on the hinges in an upwardly and rearwardly directed motion as is common. The releasable mounting fixture indicated generally at 34 for temporarily supporting the hood on the vehicle body is illustrated in FIGURES 7 and 8. The fixture consists of a base part or bar 35 with one jaw 36 of a manually releasable clamp 37 secured thereto. The clamp 37 has a movable jaw that is adapted to clamp the base 35 to the hinge element 20. A pin 39 projecting downwardly from the base is adapted to fit into the screw or bolt receiving hole (not illustrated) commonly provided in the hinge element 20 for connecting the hinge to the hood in the final assembled position of the hood. The forward end of the base 35 is angled upwardly to a forwardly projecting end portion 40 which has two upwardly projecting pins 42 spaced to enter into the bolt or screw holes provided in the hood structure for permanently connecting the hood to the hinge element. The pins 42 are angled laterally to retainingly engage the hood when passed through the fastening holes and a coil spring 43 anchored to the fixture is adapted to be stretched up into holding engagement with a flange or other projection on the underside of the hood structure.

With the foregoing supporting fixture 34 clamped to the hinge elements and the hood temporarily engaged on the pins 42 it is convenient to spray paint to the top surface of the hood and by raising the hinge assembly 20 to spray paint the underside of the hood at any selected position along the paint conveyor line.

The front fender 15 and the front inner wheel house panel 17 are supported on a fixture generally indicated at 44 which is releasably clamped to the front end of the side frame member 3. The fixture includes a first upright 45 that extends upwardly above the temporarily supported position of the hood to a longitudinally extending panel support bar 46 having upwardly and outwardly extending hooks 47 on its ends. The hooks 47 are adapted to engage under a downturned flange 48 extending along the upper inner edge of the fender. A strut 49 projecting laterally outwardly from the upright below the top bar may engage the intermediate portion of the fender to hold the fender in generally upright position.

The fixture 44 also includes a second upright 50 which is inclined rearwardly and outwardly to a second longitudinal support bar 51 also having hooks 52 on its ends arranged to engage a downturned flange 53 or other projection along the upper edge of the inner wheel house panel 17.

The supporting fixture 44 and its releasable connection to the frame member 3 is more particularly shown in FIGURES 5 and 6. An angled base 54 fits against the top and outer side of the box section of the frame member 3 and is provided with an inwardly projecting stud or pin 55 positioned to project into a hole 56 in the frame member such as is commonly provided for bolting a bumper bracket or other part to the frame of the vehicle. Secured to the upper flange of the base and projecting fixedly thereabove is a tubular post 57. Positioned forwardly of the post 57 and secured to the top of the base is a bracket 58 carrying the manually operable lever 59 of an over-centering clamp arrangement which includes a depending clamp bar 60 pivoted to the bracket at 61 and a toggle link 62 pivoted to the lever at 63 and to the clamp bar at 64. Secured to the lower end of the clamp bar by an adjusting screw 65 is a frame engaging shoe or pad 66 which desirably has a laterally turned flange 67 engageable with the underside of the frame 3. The particular construction of the manually adjustable clamp is relatively unimportant so long as it will releasably clamp the base 54 to the frame.

The first or longer upright 45 which is angled slightly outwardly and rearwardly has a straight lower end 68 (see FIG. 6) which is rotatably mounted within the post 57. A collar or shoulder 69 on the upright supports the upright on the end of the post. Positioned in telescoping and rotatable relation around the outside of the post is a cylinder sleeve 70 from which the lower or shorter upright 50 projects at an outward and rearward angle relative to the frame when the uprights are supporting the front fender and inner wheel house panel as illustrated in FIGURE 1. Both the outer sleeve 70 and the lower inner end 68 of the upright 45 define holes 71 which may be rotated into alignment with a hole 72 in the post to receive a lock pin 73 for releasably locking the uprights against rotation and uncontrolled swinging of the fender panels as the body is moved along by the conveyor.

When it is desired to paint the front fenders and front wheel house panels the pin 73 can be removed permitting laterally outwardly and forward swinging of the fender to the dotted position shown at 15A in FIGURE 4 so that a paint nozzle can be directed over the back or inner side of the fender as at 74. Similarly the wheel house panel can be swung outwardly to the position shown by dotted lines at 17A to paint the inner side of the panel. The outer sides of the fender and the wheel house panel are easily painted while the vehicle is on the conveyor as by spray guns directed against their outer sides as at 75. A body proper of the vehicle can be painted at any desired position by means of spray guns such as 76 directed toward the surfaces of the body.

With the foregoing temporary attaching fixtures holding the front and rear fenders, the inner wheel house panels and the hood which may be collectively referred to as auxiliary body panels on the body to which they are to be attached, it is practical to paint the entire body including several successive coats of paint and where desired to apply different colored paints to different parts of the body and still be assured that the parts of the body will be colored with the desired shade and color. The supports effectively hold the auxiliary panels in position as the body moves from one paint station to another as when one coat of paint is being dried and prevents damage to the newly finished surfaces by movement of the body. Where necessary or desired the longer upright 45 may be provided with a depending clip or stop 77 which rotates with the upright 45 into rotation limiting engagement with the bracket 58 to prevent the front fender in its elevated position from swinging into contact with the temporarily supported hood 19. After all parts of the body have received the desired finish the auxiliary panels are easily removed from the temporary supporting fixtures and the fixtures themselves are removed from the body and chassis so that the auxiliary panels can be attached to the identical body with which they have been painted to assure a perfect match or blend of colors on the body. The supporting fixtures are then returned for use with other bodies.

The particular details of shape and size of the supporting fixtures can be widely varied to fit automobile bodies and panels of different configurations in order to practice the method of temporarily and movably attaching auxiliary panels to the main portion of the body and advancing the body and panels together for painting from the same source or sources of paint and for keeping the parts together for drying of the paint between successive coats.

What is claimed as new is:

1. A temporary supporting fixture for painting parts of automobiles having relatively permanent elements comprising:
   an angled base engageable with two sides of one of said permanent elements,
   a releasable clamp member swingably mounted on said base and clampingly engageable with a third side of said permanent element,
   a fixed post secured to said base and projecting thereabove,
   an upright rotatably engaged and supported by said post,
   and a panel support on the upper end of said upright having generally horizontally spaced portions engageable with a detachable front panel of the automobile.

2. A supporting fixture in claim 1 in which said post is hollow,
   a second upright along with said first upright rotatably engaged and supported on the post with one upright on the inside and the other upright on the outside of said post,
   and a second panel support element extending generally horizontally from the top of said second upright and engageable with a second front panel at a different level than said first panel.

3. A support fixture as defined in claim 2 in which said post and said uprights have holes therein that are aligned in one rotated position of said uprights, and a lock pin engageable in said holes.

4. A supporting fixture as defined in claim 1 in which said base has projections thereon engageable in holes provided in a frame element for attachment of other parts of the automobile to the frame element.

5. A temporary supporting fixture for painting closure elements for automobile bodies having hinge elements connected thereto, said hinge elements having swingable parts adapted to be connected to the closure elements, said fixture comprising:
   a base engageable with the swingable part of said hinge elements,
   a manually operable hand clamp on said base releaseably engageable with said swingable part,
   and an upwardly offset portion on the base of said fixture having projections engageable in supporting relation with said closure panel.

6. A supporting fixture as defined in claim 5 in which said base has projections engageable in openings provided in the swingable part of said hinge element for connecting the closure element to the swingable part, the projections on the offset portion of the fixture being engageable in fastener receiving holes provided in the closure element for connecting the closure element to the swinging parts of the hinge elements.

References Cited

UNITED STATES PATENTS

| 2,725,034 | 11/1955 | Philp | 118—503 X |
| 2,730,461 | 1/1956 | Vawter | 118—500 X |
| 2,779,092 | 1/1957 | Gordon | 269—37 X |
| 2,952,351 | 9/1960 | Stone | 118—500 X |

ALFRED L. LEAVITT, Primary Examiner

J. H. NEWSOME, Assistant Examiner

U.S. Cl. X.R.

117—105.3

UNITED STATES PATENT OFFICE
CERTIFICATE OF CORRECTION

Patent No. 3,486,481                              December 30, 1969

Bernard B. Herrington et al.

It is certified that error appears in the above identified patent and that said Letters Patent are hereby corrected as shown below:

In the heading to the printed specification, lines 5 to 7, "Bernard B. Herrington, Rte. 1, Shelbyville, Mich. 49344, and James M. Stout, 4262 W. D Ave., Kalamazoo, Mich. 49001" should read -- Bernard B. Herrington, Shelbyville, Mich., and James M. Stout, Kalamazoo, Mich., assignors to Checker Motors Corporation, Kalamazoo, Mich.

Signed and sealed this 27th day of October 1970.

(SEAL)
Attest:

Edward M. Fletcher, Jr.                        WILLIAM E. SCHUYLER, JR.
Attesting Officer                                    Commissioner of Patents